United States Patent [19]
Bischoff

[11] Patent Number: 5,680,685
[45] Date of Patent: Oct. 28, 1997

[54] METHOD OF FABRICATING A MULTILAYER CERAMIC CAPACITOR

[75] Inventor: William P. Bischoff, San Marcos, Calif.

[73] Assignee: Microelectronic Packaging, Inc., San Diego, Calif.

[21] Appl. No.: 474,488

[22] Filed: Jun. 7, 1995

[51] Int. Cl.$^6$ .................................................. H01G 7/00
[52] U.S. Cl. .......................... 29/25.42; 29/851; 156/242; 501/134; 264/66; 361/321.4
[58] Field of Search ........................... 29/25.42, 851, 29/830, 25.41; 361/321.4, 321.5; 501/134, 135, 136; 264/61, 66, 345; 156/89, 228, 242

[56] References Cited

U.S. PATENT DOCUMENTS

| | | | |
|---|---|---|---|
| 4,027,209 | 5/1977 | Maher | 29/25.42 |
| 4,832,939 | 5/1989 | Menashi et al. | 501/134 X |
| 4,870,539 | 9/1989 | Chance et al. | 361/321.5 X |
| 4,910,638 | 3/1990 | Berghout et al. | 29/25.42 X |
| 5,453,262 | 9/1995 | Dawson et al. | 501/134 X |

OTHER PUBLICATIONS

Cross et al., *Dielectric and Mechanical Loss In The System*, Mat. Res. Bull., vol. 3, pp. 877–884 (1968).

Bar–Chaim et al., *Variations of The Dielectric Constant of PZT . . . With Electric Field*, Ferroelectrics, vol. 6, pp. 299–305 (1974).

Thomas, *A New Framework . . . Ferroelectrics*, J. Phys. Chem. Solids, vol. 51, No. 12, pp. 1419–1431 (1990).

Zhou et al., *The Thermo–Mechanical Breakdown of Ferroelectric Ceramics*, Proc. of 3d Int'l. Conf. on Properties and Applns. of Dielectric Mtls., Tokyo, Japan, pp. 1192–1194 (1991).

Burn, *Ceramic Capacitor Dielectrics*, Engineered Materials Handbook, vol. 4, Ceramic & Glass, pp. 1112–1118 (1991).

Stumpe, *Electrical Properties of Surface Layers of Oxidic Perovskites*, Ferroelectrics, vol. 131, pp. 155–162 (1992).

Elissalde et al., *Correlation Between Dielectric Properties and Nanostructure in a $Pb(In_{1/2}Nb_{1/2})O_3$ Ceramic*, Mater. Sci. Eng., B25, pp. 85–91 (1994).

Elissalde et al., *Dielectric Relaxations in Ceramics . . .* , Mater. Sci. Eng., B22, pp. 303–309 (1994).

Primary Examiner—Peter Vo
Assistant Examiner—Khan Nguyen
Attorney, Agent, or Firm—Baker, Maxham, Jester & Meador.

[57] ABSTRACT

A method of fabricating a large, rectangular, multilayer ceramic capacitor formed of alternating ceramic and electrode layers. Capacitors so formed have a high dielectric constant, extremely low leakage current and an extremely low dissipation factor. Exemplary capacitors can be made with a lead magnesium niobate dielectric composition powder to which is added several organic constituents, including a surfactant and a plasticizer, plus small amounts of several dopants, such as lithium niobate, copper oxide, magnesium titanate, manganese niobate and zirconium oxide. That total mixture is ball milled to form a slip with very small grain size. The slip is cast as a thin tape on a Mylar backing, cut into a plurality of blanks, and alternating layers of the green tape ceramic and electrode layers are laminated on a polyvinyl alcohol coated foundation plate. Firing and sintering steps are followed by application of electrical terminations to complete the capacitor. The final package is annealed to further improve the dielectric constant and the dissipation factor.

12 Claims, 4 Drawing Sheets

METHOD OF FABRICATING A MULTILAYER CERAMIC CAPACITOR

BACKGROUND

1. Field of the Invention

This invention relates generally to multilayer ceramic capacitors, and more particularly to a method for fabricating a multilayer ceramic capacitor in relatively large, flat, rectangular form having a high dielectric constant, a high breakdown voltage, a high capacitance, extremely low leakage current and an extremely low dissipation factor.

2. Discussion of the Related Art

Multilayer ceramic capacitors have been available having a variety of electrical characteristics. Barium titanate ($BaTiO_3$ has commonly been used for ceramic multi-layer capacitors. This base body material, or possibly several alternative dielectric materials, coupled with specifically identified additives, are discussed in Burn, *Ceramic Capacitor Dielectrics*, in Engineered Materials Handbook, Vol. 4, *Ceramics and Glasses*, ASM International (1991). These capacitors generally been were limited in size, energy density, capacitance and dielectric constant, so their applications were limited. For one particular example, these capacitors have generally been unsuitable for implantation in the human body as part of a cardiac defibrillator. In general, ceramic capacitors lacked the energy density required to support the primary discharge for defibrillators.

Characteristic limitations in multilayer ceramic capacitors in the past have made them not suitable for the primary high capacitance, high voltage discharge required for defibrillators. Among these limitations are relatively low dielectric constant, in the range of 2,000 to 4,000 at operational temperature, leakage current of several hundred microamps, low capacitance, typically less than 20 µf, and relatively low breakdown voltage of not greater than 30 volts. They were not able to deliver 30 J of energy at 700 volts as is required for defibrillators. These limitations prevented the necessary high peak voltage of short duration required for such devices for implanted human medical use.

Another significant limitation of ceramic capacitors is the ferroelectric effect where capacitance has in the past fallen off very sharply with increased DC bias voltage. For example, where capacitance might be in the range of 4.75 µf at 20 volts, it could fall to 1.35 µf at 200 volts and 0.7 µf at 340 volts. By way of contrast, for implantable devices a capacitor must operate at least at 700 volts without significant reduction in its capacitance. Thus, because of this striking ferroelectric effect, ceramic capacitors have not previously been thought to be applicable to implantable medical devices requiring a relatively high energy output.

Size limitations on multilayer ceramic capacitors were in part due to the fact that beyond relatively small sizes unacceptable warping occurred. Standard surface mount capacitors are typically 0.02 by 0.05 by 0.01 inch in outside dimensions. For this reason multilayer ceramic capacitor applications have not included computers and other uses where high energy, large capacitance, high dielectric constant or high breakdown voltage, or any combination of them, are required.

SUMMARY OF THE INVENTION

Broadly speaking, multilayer ceramic capacitors fabricated in accordance with this invention satisfy the requirements for large capacitance, high energy, low ferroelectric effect devices and, more particularly, have electrical characteristics which have, until now, been thought to be impossible for these types of capacitors. The products made by the process of the invention include full-ceramic, high-energy (FCHE) capacitors. These multilayer ceramic capacitors satisfy many requirements previously met only by large electrolytic capacitors but at a fraction of their size. Such ceramic capacitors can provide important electrical parameters not available even electrolytic capacitors of practical size.

A number of starting dielectric compositions may be used, and appropriate dopants are added to achieve the desired electrical characteristics. An example of a composition for a ceramic body portion used with the process of the invention is a commercially available base body formulation of lead magnesium niobate to which are added several important adders or dopants. For particular purposes, these could be: lithium niobate; copper oxide; magnesium titinate; maganese niobate; and zirconium oxide. Different dielectric compositions would likely be combined with different dopants. Also, different desired electrical parameters could result in different dopants or different amounts of any of them.

The method of the invention uses a green tape ceramic approach, rather than the common thick film process. The process formulates capacitors by layers made from the above composition, each layer being, for example, approximately 0.0015 inch thick, sandwiched with alternating layers of electrode material with standard terminations, and provides a finished product having the desired electrical characteristics.

It is the method of this invention which enables the above ceramic materials to be fabricated in finished product form having the high value parameters previously mentioned and as set out more fully hereinbelow. The ceramic constituents, together with several organic materials functioning as liquifiers, binders and plasticizers, all of which are removed before sintering, are converted to a fully dispersed colloidal suspension in a ball mill. The ceramic constituent particles are, at the same time, reduced in size, the small size of the particles contributing to achieving a high dielectric constant and having other benefits. The colloidal suspension or slip is cast on a continuously moving film such as Mylar in a very thin sheet. This green tape is cut into blanks and, with the Mylar still attached, can be moved to the lamination step. After the ceramic blanks and electrodes have been built up to the desired number of layers, the green ceramic element is fired according to a precisely determined schedule to remove the remainder of the organic materials added in the mixing step. Then the partially cured capacitor is sintered in a kiln according to another precisely determined schedule. After the ends are abraded to expose the electrodes and electrically conductive end terminations are applied, the capacitor is annealed to further improve the dielectric constant and the dissipation factor.

BRIEF DESCRIPTION OF THE DRAWING

The objects, advantages and features of this invention will be more readily perceived from the following detailed description, when read in conjunction with the accompanying drawing, in which.

DETAILED DESCRIPTION OF THE PREFERRED EMBODIMENTS

Because each step and substance used in this process can be critical to the end product, it is presently contemplated to be necessary to test each batch of the dielectric base body composition. The description of an exemplary test procedure, which can be employed with a lead maganese niobate dielectric composition base powder ($PbMg_{1/3}Nb_{2/3}O_3$) preferably used in the process of the invention to form capacitors having particular electrical parameters, will be adequate for purposes of this description. Other procedures may be effective. A sample of approximately one-half pound of the dielectric base composition powder is mixed with several organic constituents to achieve a spreadable dispersed colloidal dispersion or slurry. In this example, these are ethanol, deionized water, butyl benzyl phthalate, nonylphenol polyethylene glycol ether and polyvinyl butyral resin. They may be collectively referred to as liquifiers, binders and plasticizers. These organics have short hydrocarbon chains and are evaporated and sublimed out of the dispersion at relatively low temperatures. The amounts of these organic constituents are based on a percentage of the weight of the dielectric composition and are as follows:

about 25–40% ethanol, with 35% being preferred, about 5–15% deionized water, with 10% being preferred, about 0.5–2.0% butyl benzyl phthalate, with 1.5% being preferred, about 0–12% nonylphenol polyethylene glycol either, with 5% being preferred, and about 6–12% polyvinyl butyral resin, with 8% being preferred.

The ethanol helps to liquify the base powder and the resin, and is easily evaporated out of the mixture. This mixture is hydroscopic and the dionized water is added to reduce any tendency it would have to absorb moisture in an uncontrolled way. Butyl benzyl phthalate, available from Monsanto Chemical Company under the trade name Santicizer 160, is a plasticizer which keeps the ceramic pliable and handleable in its green tape form. The glycol either is a surfactant which assists in evenly dispersing the fine base powder throughout the mixture. The resin acts as a binder, holding the ceramic together in its green tape form. It is available in several formulations from Monsanto Chemical Company under the trade name Butvar. The B-79 formulation is presently preferred.

This mixture is ball milled in a standard ball mill for about 12 hours. The ball mill used includes resin coated balls in a resin coated jar. The resulting colloidal dispersion is then cast as a tape about 0.004 inch thick with a conventional tape caster which applies the thin coating of the mixture, using a doctor blade, to a thin sheet, such as polyester film sold under the trade name Mylar. Using standard process and electrode materials, a one inch by one inch two-layer capacitor is formed from the ceramic tape. This capacitor is electrically tested for dielectric constant, which, at this stage, should be at least 15,000 to 18,000, and for dissipation factor, which should be less than about 0.01%. The parameters are easily determined (DF), using a standard bridge measurement instrument. Capacitance and DF are measured directly. The formula for calculating dielectric constant is:

$$C = \frac{KA}{T} \qquad \text{(Eq. 1)}$$

where C is capacitance,

A is the active area of the electrodes, and

T is the thickness of the ceramic layer between the electrodes.

The dielectric constant, K, can easily be determined from all the other available factors. If the electrical characteristics are not met, the batch is discarded. If they are met, the base body batch is then used to form capacitors in accordance with the invention process.

To form actual ceramic material from which a capacitor is made according to the invention, any desired amount of dielectric composition which has been tested to be satisfactory for making the ceramic capacitor of the invention may be employed. The method of the invention is set out in the flow diagram of FIG. 4. While the drawing shows separate steps of blending the base material, blending in the adders, and ball milling, these can be accomplished in a single step as well as being a three-step process. They will be described herein as a single step.

As described above, the lead magnesium niobate is mixed with the five organic constituents and an additional five dopants, the latter being important parts of the final product. Note that the specified dopants are employed to fabricate capacitors having particular characteristics, in this case, capacitors being suitable for use in implantable defibrillators. This set of dopants and final product parameters are set out here by way of example only and are not to in any way limit the breadth of the process of the invention. These dopants are sometimes referred to as shifters or adders. They are employed to shift or adjust parameters of the finished capacitor. The percentages of these five constituents are based by weight on the dielectric composition powder:

about 0.7 to 1.3% Lithium niobate ($LiNbO_3$), with about 1% being preferred, about 0.015 to 0.025% Copper oxide (CuO), with about 0.02% being preferred, about 0.7 to 1.3% Magnesium titanate ($MgTiO_3$), with about 1% being preferred, about 1.7 to 2.3% Maganese niobate ($MnNbO_3$), with about 2% being preferred, and about 0.04 to 0.05% Zirconium oxide ($ZrO_2$), with 0.05% being preferred.

The functions of the $LiNbO_3$ are to maintain a high dielectric constant (K) and to lower the sintering temperature. The purpose of a high dielectric constant is evident to a person of ordinary skill in this technical field, and is well documented herein. Reducing the sintering temperature reduces the amount of energy necessary for that step in the process. By making the sintering temperature less than 1,000° C. the capacitor electrodes can be made of palladium-silver, a much cheaper substance than the platinum electrode material which would be needed with sintering temperatures exceeding 1,000° C.

The copper oxide functions as a grain growth inhibitor during the sintering process, which is described later.

The next two constituents ($MgTiO_3$ and $MnNbO_3$) have important functions with respect to the Curie point of the ceramic capacitor. The Curie point is the point of maximum capacitance, lowest dissipation factor (DF) and lowest equivalent surge resistance (ESR). In some instances, such as the example being described, it is valuable to develop a capacitor in such a way that in use it operates at the Curie point. The Curie point of the dielectric composition by itself is about 10° C. For implantable devices, it is important that the Curie point match the human body temperature (37° C.) as closely as possible for the reasons stated above. These two constituents establish the Curie point centered at 37° C., and at the same time broaden the Curie point ±3° C. either side of center. Another function of the magnesium titanate is to compensate for magnesium depletion which occurs during the firing steps. This constituent prevents a parasitic phase from occurring at the firing stage, which would detrimentally affect the electrical characteristics of the capacitor.

A final and very critical constituent of this particular capacitor is the zirconium oxide. Zirconium oxide is normally not used in ceramic capacitors because it not only reduces the dielectric constant but, more importantly, it is known to have a tendency to poison the whole ceramic so that it effectively turns to dust upon sintering. It has been found that the $ZrO_2$ employed in this ceramic material is critical in a positive sense and that the amount of 0.05% $ZrO_2$ cannot be exceeded without the likelihood of having adverse consequences. One unexpected benefit of this level of $ZrO_2$ is that it creates microfractures and makes the entire ceramic structure in its final form more compliant. This combination of compliance and microfractures prevents further propagation of cracks due to voltage overloads and mechanical shock in the final product. Additionally, the $ZrO_2$ also functions as a Curie point shifter.

The mixture described above is referred to as a "slip." This slip is ball milled in a standard ball mill apparatus for about 46 hours. At that point, the particle size should uniformally be less than about 0.4 μm in diameter with normal 3 sigma distribution. If upon testing at this stage the stated particle size is not realized, the milling process should be continued until the desired particle size is achieved.

Figure 4:
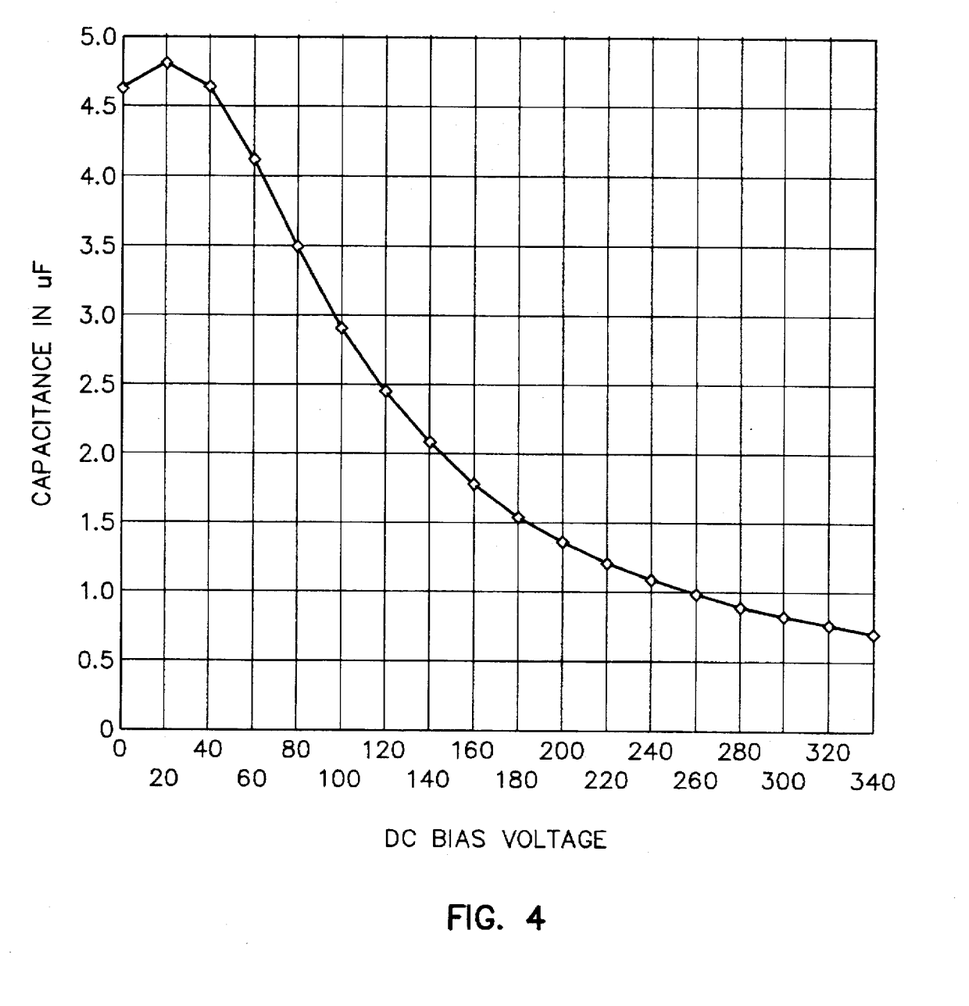
FIG. 4 is a capacitance versus voltage curve of prior art ceramic capacitors exhibiting typical ferroelectric effect.
Figure 5:
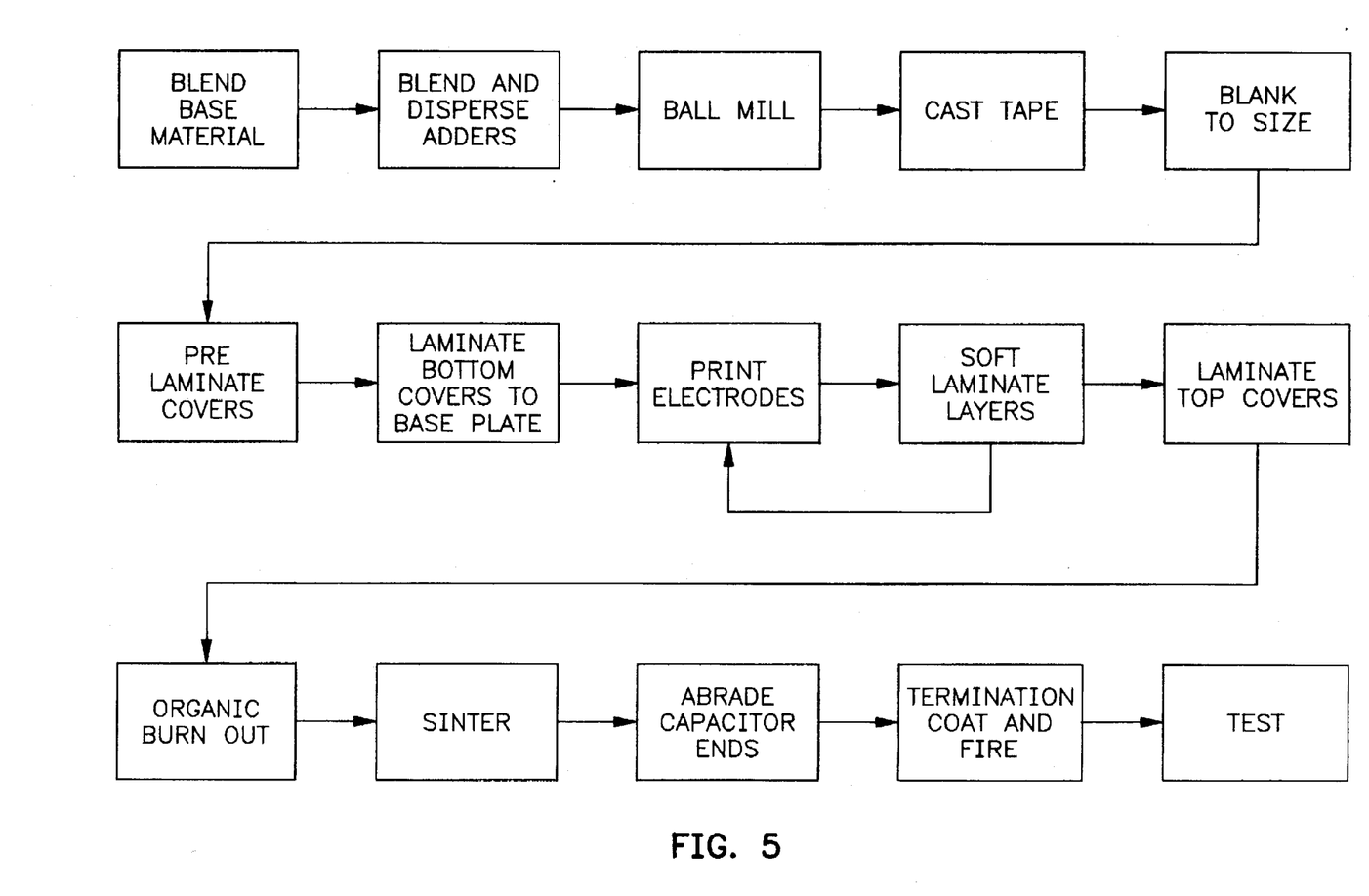
FIG. 5 is a flow chart of the process of the invention.

A very small grain or particle size, together with the dopants, contributes to reduction of both the electrostrictive effect and the ferroelectric effect, which effects reduce capacitance with increased applied voltage. An example of the ferroelectric effect on a typical ceramic capacitor is shown in FIG. 4. Note the very sharp decline in capacitance with increased voltage, starting at the relatively low level of about 40 volts. Over a range of only about 350 volts the capacitance declines about 90%. The exemplary capacitor fabricated by the process of this invention is capable of maintaining a very high capacitance value throughout its operative range. The capacitance will be reduced by no more than 30% over the entire bias voltage range of 0–1,000 volts.

While reduction in the ferroelectric effect is directly affected by grain size, that is not an unlimited parameter change. That is, there are practical limitations to the effects of reduced grain size. The smaller the grain size, the less likely that the green tape would hold together and it would not sinter properly absent other factors which would counter the reduction in grain size. By contrast, the normal grain size for ceramic capacitors is 1 to 2 μm. Note that in the process of this invention, the grain size is specified as at least as small as about 0.4 μm. In actuality 0.4 μm is the target, with about 1% of the powder grains being as large as 0.6 μm, and some being smaller and referred to as "fines." It has been found that in the combination of the dopants it is not presently known which of them, in combination with the fine particle size, contribute the most toward reduction of the ferroelectric effect. However, it is known that the copper oxide, which functions as a grain inhibitor, contributes in a significant way to the great improvement in reducing the ferroelectric effect.

Once the desired grain size is achieved, the slip is cast on a surface such as 0.002 inch-thick Mylar having a silicon coat thereon for easy release of the ceramic material. The tape is cast at about 0.0015 inch thick by conventional means. The tape caster employed is capable of casting ceramic layers ranging between 0.0005 and 0.020 inch thick, and the ceramic layer of this invention can range from 0.0005 to 0.005 inch thick.

If desired, the slip may be de-aerated before tape casting. This may be accomplished by pouring the slip into a container and pulling a vacuum thereon for about 2 to 5 minutes. The vacuum may be in the range of 24–29 inches of Hg.

When the ceramic tape is formed, which may be approximately one foot wide by many feet long on the endless Mylar sheet, the process of actually fabricating the capacitor can commence. Rigid plastic foundation carrier plates may be used to hold segments of the green ceramic tape for electrode printing and lamination. These foundation plates may be used many times. An example of a suitable foundation plate is 1/8th inch thick acrylic resin sold under the trade name Lucite. The foundation plate is cut into 3 inch squares. Some simple means such as chamfering one corner of the foundation plate may be used for orientation of the plates during printing. It has been found that by coating the operating surface of the foundation plate with polyvinyl alcohol (PVA) the ceramic components are easily released. The PVA is preferably applied to the foundation plate in three coats using a foam brush.

Figures 1, 2:
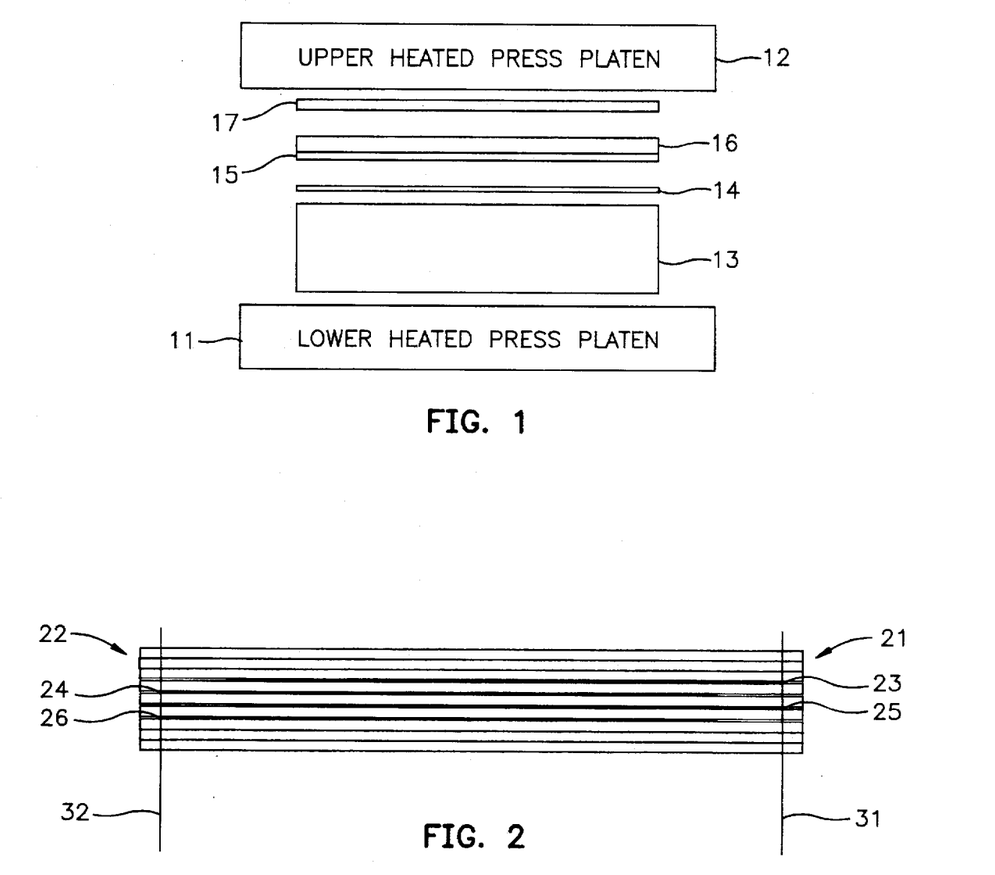
FIG. 1 is an exploded side view of a preliminary step in the process of fabricating the multilayer ceramic capacitor of the invention.
FIG. 2 is a side view of the resultant of several steps in accordance with FIG. 1 to form an example of the capacitor of the invention.

The green ceramic tape with the Mylar backing is cut into 2 inch squares in a blanking step. The next step in the process is shown in FIG. 1 where lower press platen 11 and upper press platen 12 are heated to about 85° C. Then foundation plate or carrier 13, with its PVA coating 14, is placed on platen 11. One of the squares of ceramic green tape is placed on the PVA coating, ceramic 15 side down with Mylar casting element 16 on top. An important aspect of the process is that the Mylar film provides the means to be able to handle and move the very thin, very delicate green ceramic tape as the layers are assembled. Soft 1/16th inch thick rubber pad 17 is placed on top of the Mylar faced ceramic, and upper platen 12 then compresses the stack of elements under pressure of about 1,500 psi for about 15 seconds. At this time, the press is opened and Mylar sheet 16 is peeled off, leaving ceramic 15 laminated on PVA coating 14. This procedure may be repeated twice for a total of three ceramic layers laminated between top Mylar sheet 16 and PVA coating 14. This combination of layers comprises the bottom inactive cover layer or element for the final ceramic capacitor.

Figure 6:
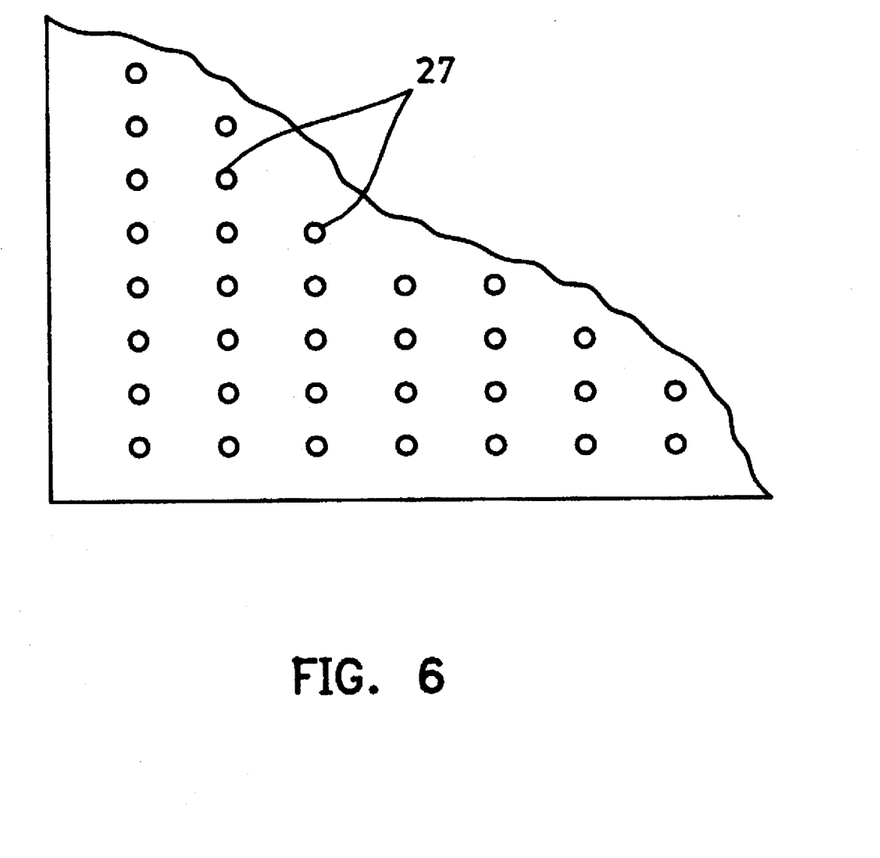
FIG. 6 is a partial plan view of an electrode formed in accordance with this invention showing the grid of holes therethrough.

An equivalent top cover is also formed in the same way. A preferred method for making the covers is to laminate all three ceramic layers simultaneously rather than separately. Of course, three ceramic layers is not an invariable requirement for the covers. At this stage, electroprinting takes place. The electrode material is a standard 70/30 palladium-silver thick film ink. This is conventional material readily available from a number of sources and is in the form of a paste which is 70% silver and 30% palladium. The electrode is screen printed using a 400 mesh stainless steel screen, preferably in such a way that it leaves a grid of holes throughout the surface of the electrode. A portion of an electrode showing holes 27 therein is shown in FIG. 6. Thus, after lamination, the top Mylar sheet is peeled off and on top of the third layer of the inactive cover the first electrode is printed. This is typically done by placing the foundation carrier with the three layers of ceramic in a conventional printer, and printing the first electrode pattern. As presently contemplated, the electrode is a sheet covering most of the ceramic surface, leaving a larger margin on one side. It is about 12 μm or 0.00048 inch thick, ranging between 5 μm and 14 μm (0.0002 to 0.00056 inch) thick, and has a hole pattern of 27 holes each way, each hole being in the range of 0.008 to 0.020 inch in diameter, and preferably about 0.012 inch in diameter. This would leave about 8 to 8.5% of the surface not covered with the conductive electrode. After it is screened onto the ceramic surface, this electrode pattern is dried for about 10 minutes at about 75° C.

Figure 3:
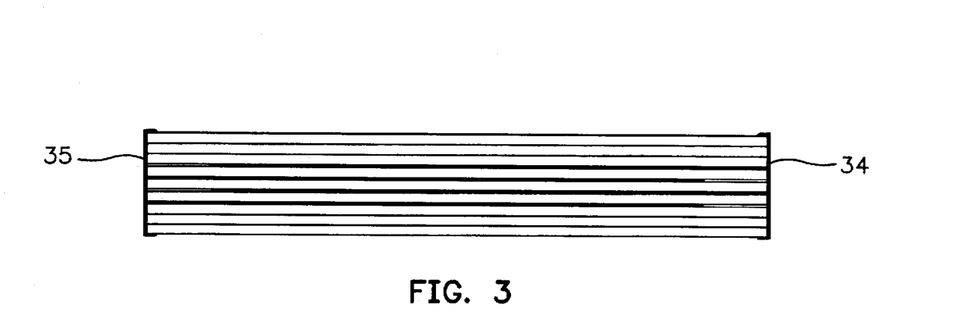
FIG. 3 is a side view of the completed capacitor of FIG. 2 constructed with electrical terminations.

To continue fabricating the capacitor, the foundation plate and the cover layer with the first electrode pattern thereon are placed in the lamination press and a new green tape layer with the Mylar backing still in place is laid on top of the electrode and laminated at about 400 psi for about 15 seconds. The Mylar film is peeled off after the laminating step. The foundation carrier and beginning capacitor structure are then returned to the printer and shifted in position so that the second electrode pattern is offset slightly from the first, leaving a similar larger margin on the opposite side. This is shown in FIG. 2, where electrodes 23 and 25 are on the right side and electrodes 24 and 26 are on the left side. The second electrode, generally identical in pattern with the first, is then printed on the new ceramic layer from which the Mylar backing has been removed after the ceramic blank has been laminated into position on the top of the last-printed electrode. This procedure is continued until the desired number of layers are laminated. Although only four electrodes are shown in FIGS. 2 and 3, this is exemplary only and a useful capacitor may be comprised of 20 electrode layers. By way of further example, it is contemplated that multilayer ceramic capacitors fabricated in accordance with this invention can have as few as five active layers and as many as 100 active layers. Another inactive cover element of three ceramic layers is laminated to the top of the last electroprinted ceramic layer and placed back in the lamination press for about 1.5 minutes at about 1,500 psi to complete the package.

During the lamination process, ceramic material is forced through the holes in the electrode pattern layers. This provides additional bonding strength, and surprisingly, the holes through the electrode patterns result in further reduction of the ferroelectric effect. In effect, this process creates columns between adjacent ceramic layers and contributes to maintaining the finished product in a very flat state, preventing warping.

The PVA and ceramic laminate are removed from the foundation carrier for further processing. This is a delicate process and, because the capacitor is still in a green state, must be accomplished very carefully. Since the PVA extends beyond the edges of the capacitor laminate, it can be lifted by applying a piece of transparent tape, or equivalent, to one corner area of the PVA and carefully lifting. This will lift the green capacitor element together with the PVA. The PVA sheet is then carefully peeled from the flat surface of the capacitor. Appropriate means such as a heated knife is used to trim the laminate to the proper size using a conventional sizing tool. Trim lines 31 and 32 in FIG. 2 indicate the portions trimmed off the green capacitor. Note that this trimming step exposes one edge of alternating electrodes 23 and 25 at side 21, and to the other alternating electrodes 24 and 26 at side 22 of the capacitor laminate.

For the step of completion of organic material removal by the application of heat, it is necessary to prepare appropriate setters in which the trimmed green (unfired) capacitors are placed for the heating and sintering steps. Note that about 90% of the organic materials are removed by evaporation during the tape casting process which includes an air wash commencing at about 110° C. (ranging from about 80° C. to about 125° C.) and diminishing in temperature over the length of several feet in an enclosed plenum after the ceramic material has been applied to the Mylar (the tape has been cast), typically in a continuously moving fashion. This is very clean filtered air. The final organic removal process is only necessary for removing the last approximately 10% of the organic materials from the ceramic capacitor and this is accomplished by sublimation at temperatures below the boiling points of each of the organics employed and well below the sintering temperature of the capacitor. The setters are preferably rigid zirconia elements which can withstand very high temperatures. The upper surfaces on which the green capacitors rest are "sweetened" as described here. The scrap green tape from the trimming and blanking steps is devolved in acetone to make a solution with the viscosity of thick cream. The top surfaces of the zirconia setters are painted with a heavy coat of this material and fired for about 10 minutes at about 1,000° C. This procedure is necessary to create a lead-rich atmosphere during the capacitor firing steps. The lead-rich atmosphere permits proper sintering of the capacitors. It has been found that without a lead-rich atmosphere available during the capacitor firing steps, the capacitors could turn to dust rather than a rigid element being formed.

After the zirconia setters have been sweetened, the green capacitors are placed thereon and inserted into a programmable oven for removal of the organics. The program for the organic removal step, after the green capacitors are placed in the oven, is as follows:

1. Temperature ramp up at about 1° C. per minute, possibly 0.5° to 2.0° C. per minute, to a level of about 300° C. (295° to 310° C.).
2. Maintain the oven temperature at about 300° C. for about 36 hours, ±10%.
3. Temperature ramp up at about 5° C. per minute, possibly 1°–10° C. per minute, to a level of about 450° C.,±10%.
4. Maintain the oven temperature at about 450° C. for 24 hours, both parameters being±10%.
5. Ramp down to room temperature at about 30° C. per minute, or as fast as the oven and load will reduce temperature.

As presently contemplated, the above heating program and the sintering program below should be adhered to quite closely. The organics must be sublimed or driven out at a steadily growing rate. The more volatile organic constituents are first sublimed and then the temperature is increased to sublime or diffuse the less volatile constituents. It is necessary to keep the temperatures below the boiling point of each organic constituent and to prevent carbonizing any of them. In the following sintering step, the final curing of the ceramic material, which is then free of non-ceramic additives, also must follow a carefully programmed temperature change schedule. Too rapid a temperature change could shock the partially completed capacitor and destroy it completely, either physically or electrically, or both. Similarly a too low or a too high temperature could have deleterious effects. The organic removal process should be accomplished in a nitrogen ($N_2$) environment. The purpose of the nitrogen environment is to aid in sintering. Without the $N_2$, it is possible that the sintering process would effectively destroy, rather than cure, the final capacitor.

The partially cured capacitors and setters are removed from the oven and placed in a programmable firing kiln. Alternatively, the firing kiln may be the same as the oven used for the organic removal process. The final sintering steps are as follows:

1. Temperature ramp up at about 20° C. per minute, possibly 10°–30° C. per minute, to about 940° C., ranging up to 960° C.
2. Maintain the kiln temperature at about 940° C., to as high as 960° C. for about 60 minutes, ranging between 40 and 80 minutes.
3. Temperature ramp down at about 20° C. per minute, possibly 10°–40° C. per minute, to 800° C., ranging down to 700° C.
4. Maintain the kiln temperature at about 800° C., and down to as low as 700° C., for about 120 minutes, ranging between 100 and 140 minutes.
5. Turn off the kiln and allow the kiln and contents to cool. The step at 700°–800° C. is for annealing the sintered capacitor to drive out excess base body material from the grain boundary, in this case excess lead. This improves the K and the DF of the capacitor.

Next the fired capacitors are removed from the kiln and opposite edges are abraded to ensure that the alternating electrode materials are exposed at the opposite edges. A suitable means for abrading the edges is with 220 grit wet or dry sandpaper, which is wetted with isopropyl alcohol to act as a lubricant to reduce clogging of the surface of the sandpaper. Of course, other substances could function satisfactorily. The exposed electrode edges are then dipped into palladium-silver termination material or ink and dried at about 125° C. for about 20 minutes, forming end terminations 34 and 35. The capacitor as thus fabricated is shown in FIG. 3 with alternating electrodes connected to the end terminations after firing. A group of now nearly completed capacitors is again placed on the zirconia setters and fired at about 725° C. for about 11 minutes at temperature, which is appropriate for these particular terminations. This is an additional sintering step for the end terminations.

At this stage, each capacitor is tested for proper electrical characteristics. The desired parameters of the capacitors described by way of example are:

1. Breakdown voltage at least 700 v, preferably 1000 v.
2. Capacitance of 100–150 µf.
3. Deliver 25–40 J in a 10–20 ms pulse.
4. A volume form factor of 1.5 inches by 2.0 inches by 0.06 inch for a 20–30-layer capacitor.
5. Nominal leakage current $\leq 10$ pico amps at 1000 v.
6. Energy density greater than about 10–20 J/cc.
7. Operates with these parameters at 37° C.±3° C.

Capacitors fabricated in accordance with this invention, and with the constituents identified by way of example, can be made in sizes ranging from 0.5 inch square up to at least 3 by 5 inches with as many as 100 layers at desired tolerances and yields. But the process is not limited to the particular constituents use for exemplary purposes. There are a number of important process steps that can be employed for any multilayer ceramic capacitor having the great size and any of the enhanced electrical parameters mentioned herein. These include: the use of the Mylar film to facilitate handling of the green tape blanks; the controlled reduction in grain size of the constituents of the capacitor; the use of PVA to facilitate release and removal of the green capacitor from the carrier; the use of perforations in the electrodes for added strength and reduction in the ferroelectric effect; the precise organic removal and sintering schedules; and the final annealing step.

In view of the above description it is likely that modifications and improvements will occur to those skilled in the technical field which are within the spirit and scope of the appended claims.

What is claimed is:

1. A method of making a multilayer ceramic capacitor comprising the steps of:
    selecting a dielectric composition powder as a base material;
    adding predetermined amounts of organic materials functioning as liquifiers, binders and plasticizers, the organic materials being easily evaporated and sublimed substantially below the sintering temperature, and adding selected dopants in powder form in predetermined amounts;
    ball milling the combination of dielectric composition, dopants and organic materials to form a fully dispersed colloidal suspension slip and for a sufficient time to reduce the composition to particles having a predetermined size range;
    casting the slip on a sheet of polyester film in tape form at an elevated temperature to evaporate a significant portion of the organics added to the dielectric composition powder, thereby forming a green tape;
    forming a multilayer capacitor laminate green capacitor body of alternate layers of ceramic blanks formed from the green tape and electrodes by lamination under pressure, the electrodes as applied to the ceramic blanks being perforated within multiplicity of holes through which ceramic material passes during the laminating process;
    completing removal of the organics by subjecting the green capacitor body to predetermined temperatures for predetermined periods of time according to a first schedule to form a partially cured capacitor;
    sintering the partially cured capacitor at further predetermined temperatures for predetermined periods of time according to a second schedule; and
    adding terminations to make selective electrical connection with the electrodes in the ceramic capacitor.

2. The method recited in claim 1, wherein the second schedule includes the step of annealing the sintered capacitor to remove excess base body material from the grain boundary.

3. The process recited in claim 1, and comprising the further step of abrading opposite edges of the sintered capacitor to expose alternating electrodes on each edge for connection to the electrical terminations.

4. The method recited in claim 1, wherein said forming step comprises:
    cutting the green tape and polyester film to predetermined equal size blanks with the polyester film remaining thereon;
    moving each blank to place it on top of each prior blank;
    removing the polyester film from the last-placed ceramic blank;
    laminating together a first plurality of said blanks to form a top inactive cover element and laminating together a second plurality of said blanks to form a bottom inactive cover element;
    alternately printing an electrode on one side of one of said bottom cover element and laminating thereon another of said blanks followed by additional printing and laminating steps; and laminating said top cover element to the top of the last electrode layer on the capacitor laminate.

5. The method recited in claim 1, wherein the electrode layers are screen printed through a 400 mesh stainless steel screen onto a green tape ceramic blank to form a sheet about 0.0002 to 0.00056 inch thick having a plurality of holes therethrough occupying about 8–8.5% of the surface area of each electrode layer, the electrode leaving a margin on one side of the ceramic blank, each succeeding electrode leaving a margin on opposite sides of the ceramic blanks, the ceramic material forced through the holes in the electrodes during the lamination process form bonds between adjacent ceramic blanks separated by an electrode.

6. The method recited in claim 1, wherein capacitors so formed range in surface size of about 0.5 inch square to about three by four inches on a side and having active layers numbering between 5 and 100.

7. The method recited in claim 1, and further comprising the step of sintering the terminations at about 725° C. for about 11 minutes.

8. The method recited in claim 1, wherein each said ceramic layer is between about 0.0005 and 0.005 inch thick and each said electrode layer is between about 0.0002 and 0.00056 inch thick.

9. The method recited in claim 1, wherein a plurality of said ceramic blanks are laminated together on each outside face of said capacitor to function as cover elements therefor.

10. The method recited in claim 1, wherein the particles are reduced in the ball milling step to no more than about 0.04 μm in diameter with normal three sigma distribution and the polyester tape has a thickness ranging between about 0.0005 to 0.005 inch.

11. A method of making a multilayer ceramic capacitor comprising the steps of:

selecting a dielectric composition powder as a base material;

adding predetermined amounts of organic materials functioning as liquifiers, binders and plasticizers, the organic materials being easily evaporated and sublimed substantially below the sintering temperature, and adding selected dopants in powder form in predetermined amounts;

ball milling the combination of dielectric composition, dopants and organic materials to form a fully dispersed colloidal suspension slip and for a sufficient time to reduce the composition to particles a predetermined size range;

casting the slip on a sheet of polyester film at an elevated temperature to evaporate a significant portion of the organics added to the dielectric composition powder, thereby forming a green tape;

forming a multilayer green capacitor body of alternate layers of green tape and electrodes by lamination under pressure;

completing removal of the organics by subjecting the green capacitor body to predetermined temperatures for predetermined periods of time according to a first schedule to form a partially cured capacitor, the first schedule comprising the steps of:

placing the green capacitor body in an oven; then ramping up the temperature in the oven at about 0.5° to 2.0° C. per minute to a level of about 295° to 310° C.;

maintaining the oven temperature at about 295° to 310° C. for about 36 hours; then ramping up the temperature in the oven at about 400° to 500° C.;

maintaining the oven temperature at about 400° to 500° C. for about 24 hours; and then ramping the oven temperature down to room temperature at about 30° C. per minute;

sintering the partially cured capacitor at further predetermined temperatures for predetermined periods of time according to a second schedule; and adding terminations to make selective electrical connection with the electrodes in the ceramic capacitor.

12. A method of making a multilayer ceramic capacitor comprising the steps of:

selecting a dielectric composition powder as a base material;

adding predetermined amounts of organic materials functioning as liquifiers, binders and plasticizers, the organic materials being easily evaporated and sublimed substantially below the sintering temperature, and adding selected dopants in powder form in predetermined amounts;

ball milling the combination of dielectric composition, dopants and organic materials to form a fully dispersed colloidal suspension slip and for a sufficient time to reduce the composition to particles having a predetermined size range;

casting the slip on a sheet of polyester film in tape form at an elevated temperature to evaporate a significant portion of the organics added to the dielectric composition powder, thereby forming a green tape;

forming a multilayer green capacitor body of alternate layers of green tape and electrodes by lamination under pressure;

completing removal of the organics by subjecting the green capacitor body to predetermined temperatures for predetermined periods of time according to a first schedule to form a partially cured capacitor;

sintering the partially cured capacitor at further predetermined temperatures for predetermined periods of time according to a second schedule, the second schedule comprising the steps of:

placing the partially cured capacitor in a kiln; then ramping up the temperature in the kiln at about 10°–30° C. per minute to a level of about 940°–960° C.;

maintaining the kiln temperature at about 940°–960° C. for about 40–80 minutes; then ramping down the kiln temperature at about 10°–40° C. per minute to a level of about 700°–800° C.;

annealing the sintered capacitor by maintaining the kiln temperature at about 700°–800° C. for about 100–140 minutes; and then turning off the kiln and allowing it to cool; and adding terminations to make selective electrical connection with the electrodes in the ceramic capacitor.

* * * * *